(12) United States Patent
Abel et al.

(10) Patent No.: US 8,056,513 B2
(45) Date of Patent: Nov. 15, 2011

(54) APPARATUS FOR USE IN CONTROLLING THE SPREAD OF ECTOPARASITE-BORNE DISEASES

(76) Inventors: Bruce Alan Abel, Ellicott City, MD (US); John Allen Miller, Kerrville, TX (US); Joe Mathews Pound, Ingram, TX (US)

( * ) Notice: Subject to any disclaimer, the term of this patent is extended or adjusted under 35 U.S.C. 154(b) by 437 days.

(21) Appl. No.: 11/795,780

(22) PCT Filed: Jan. 20, 2006

(86) PCT No.: PCT/US2006/002053
§ 371 (c)(1),
(2), (4) Date: May 20, 2008

(87) PCT Pub. No.: WO2006/078913
PCT Pub. Date: Jul. 27, 2006

(65) Prior Publication Data
US 2009/0120371 A1    May 14, 2009

(51) Int. Cl.
*A01K 29/00* (2006.01)
(52) U.S. Cl. ........................................ 119/657; 119/660
(58) Field of Classification Search .................. 119/657, 119/660, 656, 663, 652, 650; D30/121
See application file for complete search history.

(56) References Cited

U.S. PATENT DOCUMENTS

| 1,734,035 | A | * | 11/1929 | Hargraves | 119/54 |
| 3,941,096 | A | * | 3/1976 | Mann | 119/657 |
| 4,023,533 | A | * | 5/1977 | Mann | 119/657 |
| 5,050,539 | A | * | 9/1991 | Liegner | 119/666 |
| 5,056,467 | A | * | 10/1991 | Schaefer | 119/666 |
| 5,367,983 | A | * | 11/1994 | Pound et al. | 119/53 |
| 6,513,458 | B1 | * | 2/2003 | Burridge et al. | 119/651 |
| 6,899,058 | B2 | * | 5/2005 | Burridge et al. | 119/651 |
| 7,156,052 | B2 | * | 1/2007 | Maupin et al. | 119/661 |

\* cited by examiner

*Primary Examiner* — Trinh Nguyen
(74) *Attorney, Agent, or Firm* — Ober, Kaler, Grimes & Shriver; Royal W. Craig

(57) ABSTRACT

A device (15) for the application of pesticides to animals as they feed and that accommodates wildlife of all sizes, poses no threat of harm to the animals, and maximizes the per capita application of pesticide. Whole kernel corn (or other feed) placed in a feed bin (30) is dispensed into a trough/receptacle (20) through an opening at the bottom of the bin. The trough/receptacle (20) is surrounded by pesticide applicators (40) such that as an animal feeds, some part of its head, neck and/or ears will contact one or more of the applicators. The applicators (40) are flexible and rotatable, so that animals attracted to the apparatus to feed are subjected to the application of a pesticide upon their head, neck, ears, and/or, where applicable, antlers or horns, the flexible and rotatable applicators (40) maximizing pesticide application with minimal stress to both the animal and device. The device employs a modular molded polyethylene design that is durable, economical, mass-producible, lightweight, and can be shipped for user-assembly, thereby reducing shipping and manufacturing costs.

17 Claims, 6 Drawing Sheets

US 8,056,513 B2

APPARATUS FOR USE IN CONTROLLING THE SPREAD OF ECTOPARASITE-BORNE DISEASES

BACKGROUND OF THE INVENTION

1. Field of the Invention

The present invention relates to devices utilized to control the spread of ectoparasite-borne diseases and, more particularly, to an improved apparatus for feeding and applying pesticides onto animals, particularly wildlife such as deer.

2. Description of the Background

A variety of diseases are transmitted to humans and animals by ectoparasites such as ticks. Certain species of wildlife, such as white-tailed deer, propagate and harbor large populations of ectoparasites in direct proximity to areas populated by humans and their domesticated pets. An effective strategy for the prevention of disease transmission through the control of ectoparasites includes the pesticidal treatment of such wildlife found in and around human-populated areas. Unfortunately, direct treatment can be challenging, especially with species that are not easily captured, restrained or otherwise handled directly. Thus, access to wildlife in order to control ectoparasites remains a challenging problem, There have been prior efforts to develop devices that passively (and surreptitiously) apply pesticides to wildlife. One noteworthy example by a subset of the present inventors is described in U.S. Pat. No. 5,367,983 to Pound et al. As shown in FIG. 1, the Pound et al. '983 patent discloses an apparatus for feeding and applying pesticides onto animals, particularly wildlife such as deer. This device includes a feed supply bin 20 that spills feed into either side of an open-topped receptacle 10. A pair of spaced apart vertical support members 30 carry pesticide applicators 31 positioned near the sides of the receptacle 10. Pesticide applicators 31 are positioned on each of the support members 30, and are adapted to apply pesticide onto an animal upon contact therewith. Pesticide is automatically supplied, for example, from pesticide reservoirs 50 at the lower end of each applicator 31 that wick pesticide into the absorbent material of the applicator. While the concept of the Pound et al. '983 device is excellent, the structural features leave room for improvement both functionally and to achieve manufacturing economy. For example, the vertical support members 30 in the aforementioned apparatus are rigid and may obstruct (or certainly do not adapt to) wildlife as they crane their heads and/or necks to feed and, therefore, may not apply adequate pesticide. Moreover, the design suggested by Pound et al. '983 was intended for sheet metal construction, thereby resulting in sharp edges that might cut the animals and susceptibility to oxidation. In addition, the entire product had to be fully assembled at the factory and shipped as a unit. This was very heavy and expensive. It has been found that a more economical modular design more suited for molded construction allows ready solutions to the foregoing problems (the Pound '983 design is not well-suited for molding). A modular molded product is comparatively lightweight, and the components can be shipped for user-assembly, thereby saving significant shipping and manufacturing costs. Therefore, there remains a need for a like device possessing an improved means for accommodating wildlife of all sizes (inclusive of all species of deer, cattle, antelope, elk, etc.), and which is formed by a simple, scalable, durable and economically mass-producible design which can be manufactured wholly or partly by molding in order to provide for more widespread use.

SUMMARY OF THE INVENTION

It is an object of the invention to provide an improved means for applying pesticides to wildlife that employs simple, durable modular componentry that is economical to manufacture, lightweight for economical shipping (the prior metal version was heavy and expensive to assemble), easy to assemble for user assemblage, and more rugged and durable in the field.

It is another object to provide a plastic-molded means for applying pesticides to wildlife as described above that avoids sharp and rusty edges to maintain the safety of the animals and operators.

It is still another object to provide an improved means for maximizing the per capita application of pesticide to deer, utilizing flexible applicators that adapt to and can accommodate animals that vary greatly in physical size, without obstructing them.

In accordance with the above objects, the present invention is designed for the application of pesticides to animals as they feed. In use, the apparatus of this invention is positioned in the locus or vicinity of the animals to be treated with feed loaded in the feed bin. Animals attracted to the apparatus to feed will be subjected to the application of a pesticide upon their head, neck, ears, and/or, where applicable, antlers or horns upon contact with one or more of a plurality of applicators.

Without being limited thereto, corn and other non-absorbent pelletized feeds are preferred. Attractions such as apple aromas may also be added to the feed as are conventional in the art.

While the apparatus may be used for applying pesticides to a wide variety of animals, including domesticated species, it is particularly valuable for the treatment of wild or captive animals, in particular those species that have antlers or horns (e.g. deer, antelope, elk, goats, cattle), as well as those that do not (swine, sheep, etc.). The preferred embodiment of the present invention is an economically-designed apparatus fabricated of a variety of lightweight, rigid materials (e.g. molded plastics) to provide the durability required by the nature of its usage. The main sub-assemblies of the present invention are well-adapted for molded fabrication and include a dual-compartment feed trough/receptacle, a feed bin, a plurality of pesticide applicators, and an optional pesticide reservoir/feed system.

Animal feed placed in the feed bin is dispensed into the trough/receptacle through an opening at the bottom of the bin. For the application of a pesticide to a feeding animal, a plurality of pesticide applicators are positioned proximate the two compartments of the trough/receptacle. The applicators are positioned such that as an animal feeds, some part of its head, neck and/or ears will contact one or more of the applicators. The applicators may be dosed with pesticide simply by wetting on a periodic basis (weekly), or automatically by an internal reservoir/feed system. To ensure contact between the animal and at least one applicator, the applicators are positioned relatively close together near the trough/receptacle feeding compartments. This creates limited side-long access through which the animal must crane their necks to reach the feeding compartment. The applicators are mounted on flexible masts that adapt to and can accommodate animals that may vary greatly in physical size, without obstructing them, thereby ensuring a full application of pesticide without exerting undue force on the applicators or the trough/receptacle.

The modular molded product employs a simple, durable, economically mass-producible design with lightweight components that can be shipped for user-assembly, thereby reducing shipping and manufacturing costs. In the field the device has greater utility because it accommodates wildlife of a variety of sizes, poses no threat of harm to the animals, and maximizes the per capita application of pesticide.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figure 1:
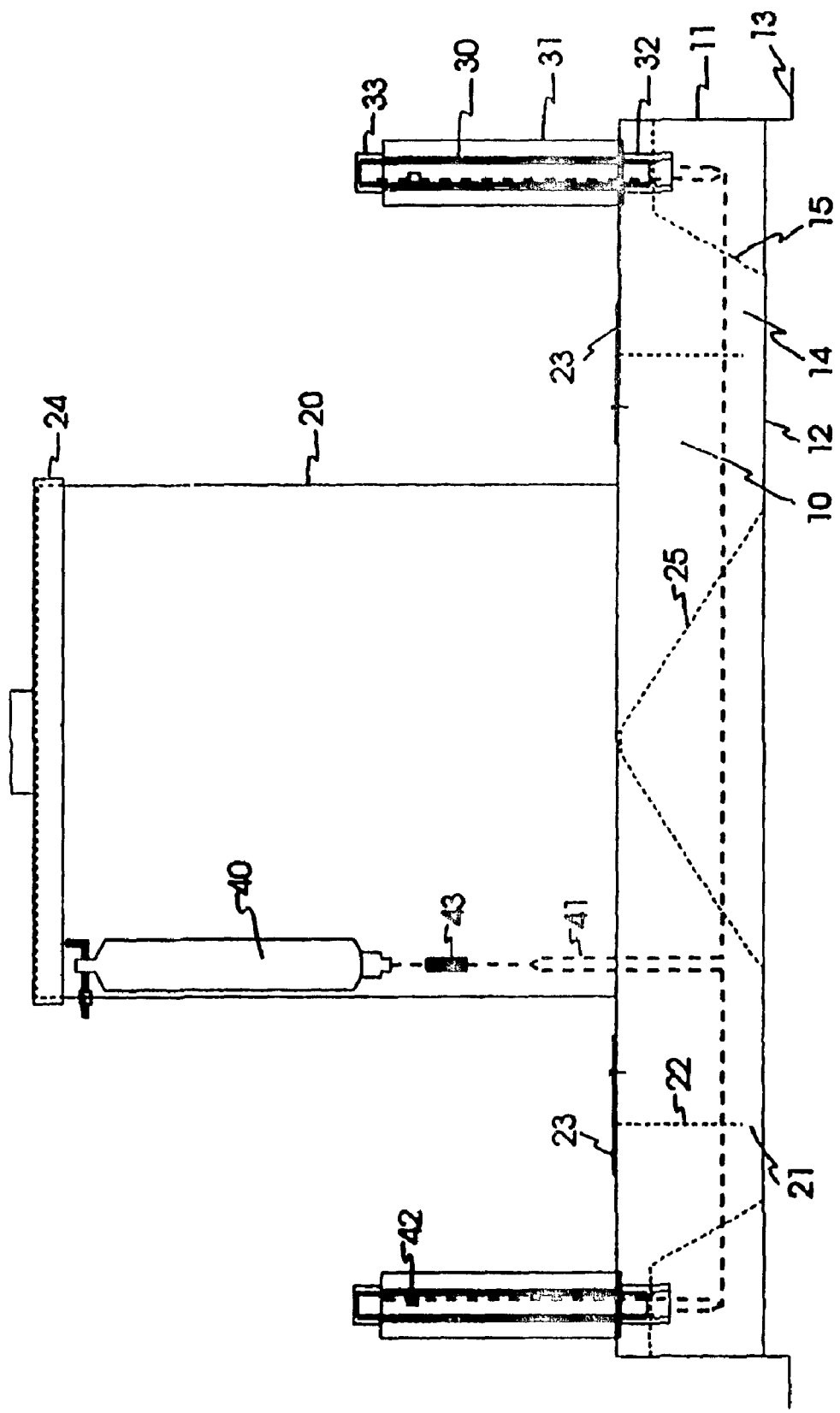
FIG. 1 is a front view of a prior art apparatus for feeding and applying pesticides onto animals from U.S. Pat. No. 5,367,983 to the inventors herein.

FIGS. 2-5 are, respectively, a perspective fully-assembled view, two perspective partial-assembly exploded views (FIGS. 3-4), and a top view (FIG. 5) of the apparatus 15 for applying pesticides to wildlife according to a first embodiment of the present invention.

The major structural components of the apparatus 15 have been simplified to five modular snap-fit plastic (e.g., polyethylene) component parts, including a lid 34, feed bin 30, feed trough/receptacle assembly 20, a plurality of flexible applicators 40 anchored in the feed trough/receptacle assembly 20, and two adjustable gate assemblies 53 for limiting access to the feed trough/receptacle assembly 20. This modular embodiment facilitates packaging of the unassembled components and shipping in two compact boxes, rather than a fully assembled product. The simple snap-fit design allows the end-user to complete the assembly. Shipping costs are drastically reduced because non-freight carriers may be used. Assembly costs are reduced, and the replacement cost of expendable parts is reduced. The modular components are described in more detail below.

Figure 3:
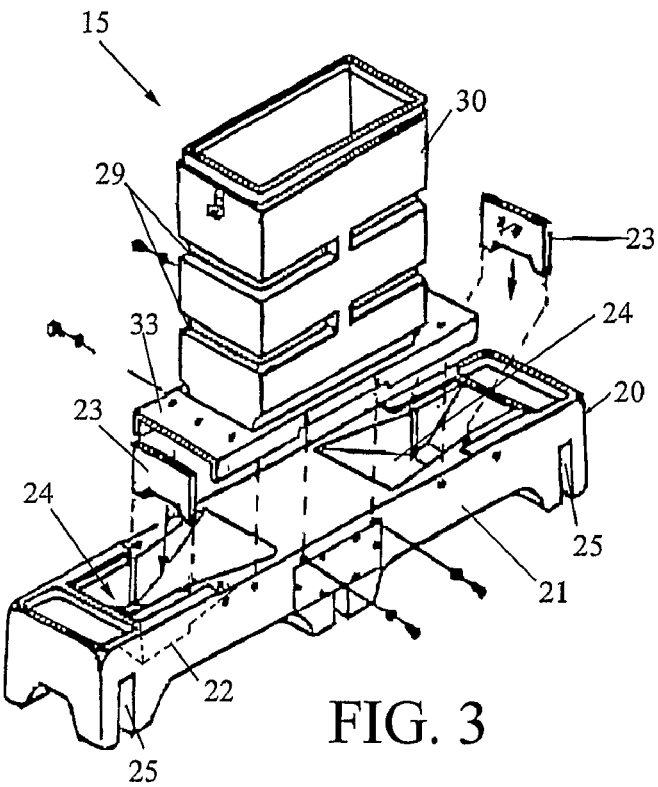
FIG. 3 is a perspective partial-assembly exploded view of the apparatus 15 of FIG. 2.

As best seen in FIG. 3, the molded plastic feed trough/receptacle assembly 20 is formed with side walls 21, a bottom 22, and two feeding compartments 24. Presently, the feed trough/receptacle assembly 20 is rotationally molded, albeit blow- or injection-molding may also be suitable. The depth of each feeding compartment 24 is preferably sufficiently shallow to allow the animal to see over the top edge of the side walls 21 while feeding. Support legs and/or a base stabilizer (not shown in the Figures) may be used to prevent the tipping over of the apparatus 15 and to allow the trough/receptacle 20 to be positioned at some distance above the ground for ease of access by the appropriate animals, and notches 25 or sleeves may be molded into the trough/receptacle 20 as shown to seat the support legs.

In accordance with the present invention, the trough/receptacle 20 is fabricated of one piece molded in high density cross-linked polyethylene or high density polyethylene plastic with integral side walls 21, bottom 22, and recessed feeding compartments 24, and molded sleeves 25 for press-fit insertion of support legs.

The feed bin 30 is open-topped and open-bottom, and the trough/receptacle 20 is formed with a central plateau that segregates the feeding compartments 24 and partially blocks the open-bottom of the feed bin 30 such that when the feed bin 30 is seated on the trough/receptacle 20 there are two opposing apertures left open at the bottom of the feed bin 30 from which feed drains evenly into the feeding compartments 24. The recessed feeding compartments 24 are formed with an outwardly-angled surface for directing the feed downwardly and sideways away from the feed bin 30 toward the sides. The low-friction polyethylene of the feeding compartments 24 coupled with downward sloping surfaces has significantly less friction than galvanized metal surfaces, thus improving the flow of corn down the slopes.

The supply of animal feed for the apparatus 15 comes from the molded plastic feed bin 30 that is positioned above the trough/receptacle 20 and is dispensed from the bin 30 into the feeding compartments 24 where it may be accessed by animals, through the opposing apertures or openings at the lower end of the bin 30. Preferably, a pair of guillotine divider gates 23 are inserted into corresponding notches formed in the sides of the trough/receptacle 20 to partially block access to the bin 30. These gates 23 may be adjustable up/down to vary the size of the opening, or may be fixed and interchangeable (with varying apertures) in order to regulate the flow of the feed from the bin 30. This helps to prevent large amounts of feed from being dispensed into the feeding compartment 24 at one time. Limiting the size of the openings to control the amount of feed dispensed into the feeding compartments 24 prevents the animal from rapidly consuming large amounts of feed and thus aids in keeping the animal at the apparatus 15 for a longer period of time. The use of adjustable gates 23 is preferred when it is envisioned that different feeds may be employed. It is also noteworthy that the floors 22 of the feeding compartments 24 are recessed below the feed slopes leading from the feed bin into feeding compartments 24. This in combination with the gates 23 aid in preventing water and moisture from creeping back into the feed bin 30, or from falling into the feeding compartments 24, thereby soaking the corn.

Protection of the feed in the feed bin 30 is afforded by a plastic cover or lid 34 that may be friction fit, or pivotally attached to the bin 30, and secured in place via two latching brackets 35. The position of the bin 30 relative to the trough/receptacle 20 is not critical; it may be positioned approximately centrally or adjacent an end of the trough/receptacle 20.

In accordance with the present invention, the feed bin 30 is fabricated of lightweight, rigid molded plastic (preferably also high density cross-linked polyethylene or high density polyethylene plastic) with annular reinforcing ribs 29. The feed bin 30 is preferably anchored to the receptacle 20 by a friction-fit shroud 33 that fits over the sidewalls of the receptacle 20. As best seen in FIG. 3, the outwardly extending shroud 33 is integral to the base of the feed bin 30 and is formed as a substantially horizontal plate with angled edges conforming to the sides of receptacle 20 to anchor it onto the receptacle 20. The shroud 33 extends partially over the bin opening.

Both the feed bin 30 and trough/receptacle 20 are fully recyclable, may be made in any color, and include non-removable and non-fading EPA pesticide warning labels integrally formed into the plastic. The shape of the trough/receptacle 20 and the number of feeding compartments 24 may be varied, and other shapes (e.g. circular, oval, square) having more or fewer feeding areas may be utilized.

Figure 2:
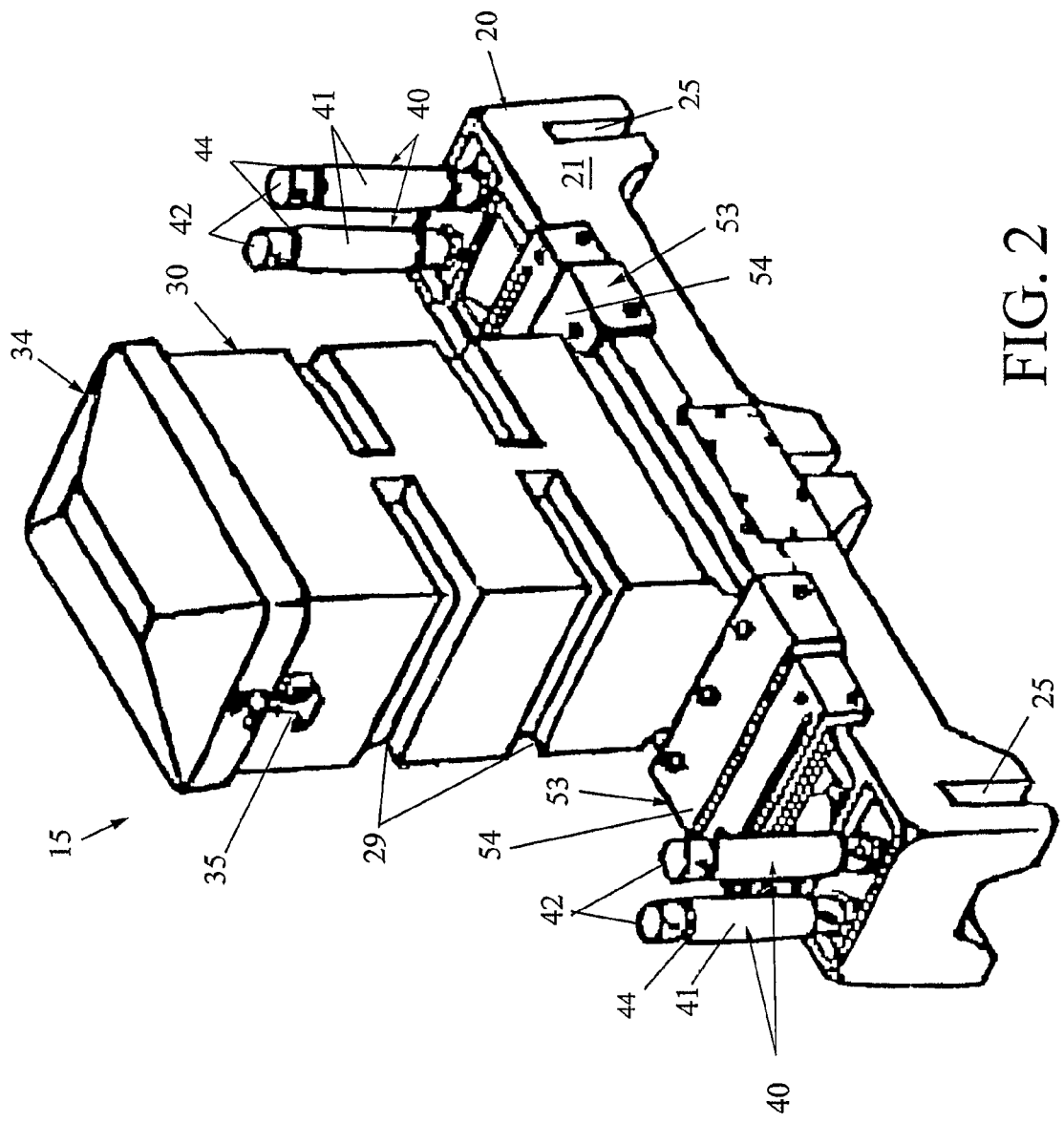
FIG. 2 is a perspective fully-assembled view of an apparatus 15 for applying pesticides to wildlife according to a first embodiment of the present invention.
Figure 4:
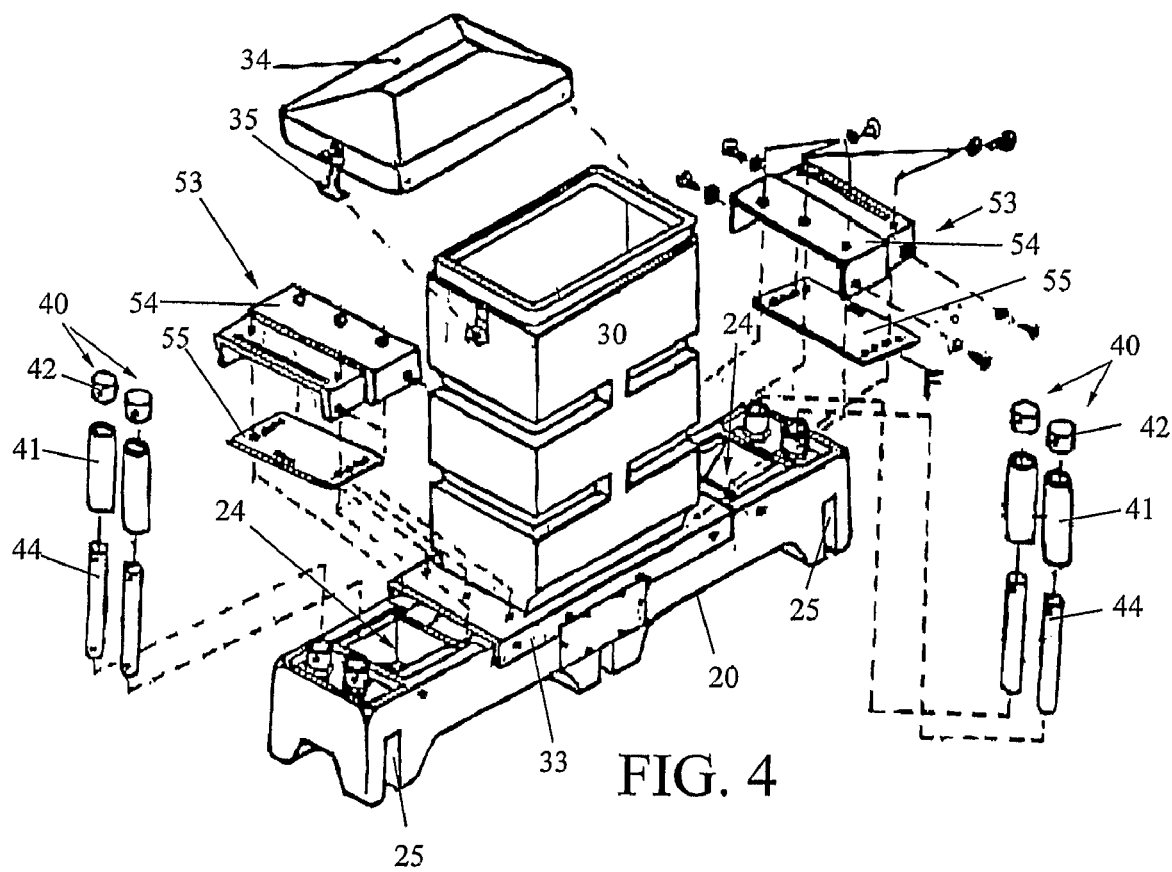
FIG. 4 is a perspective partial-assembly exploded view of the apparatus 15 of FIG. 2.
Figure 5:
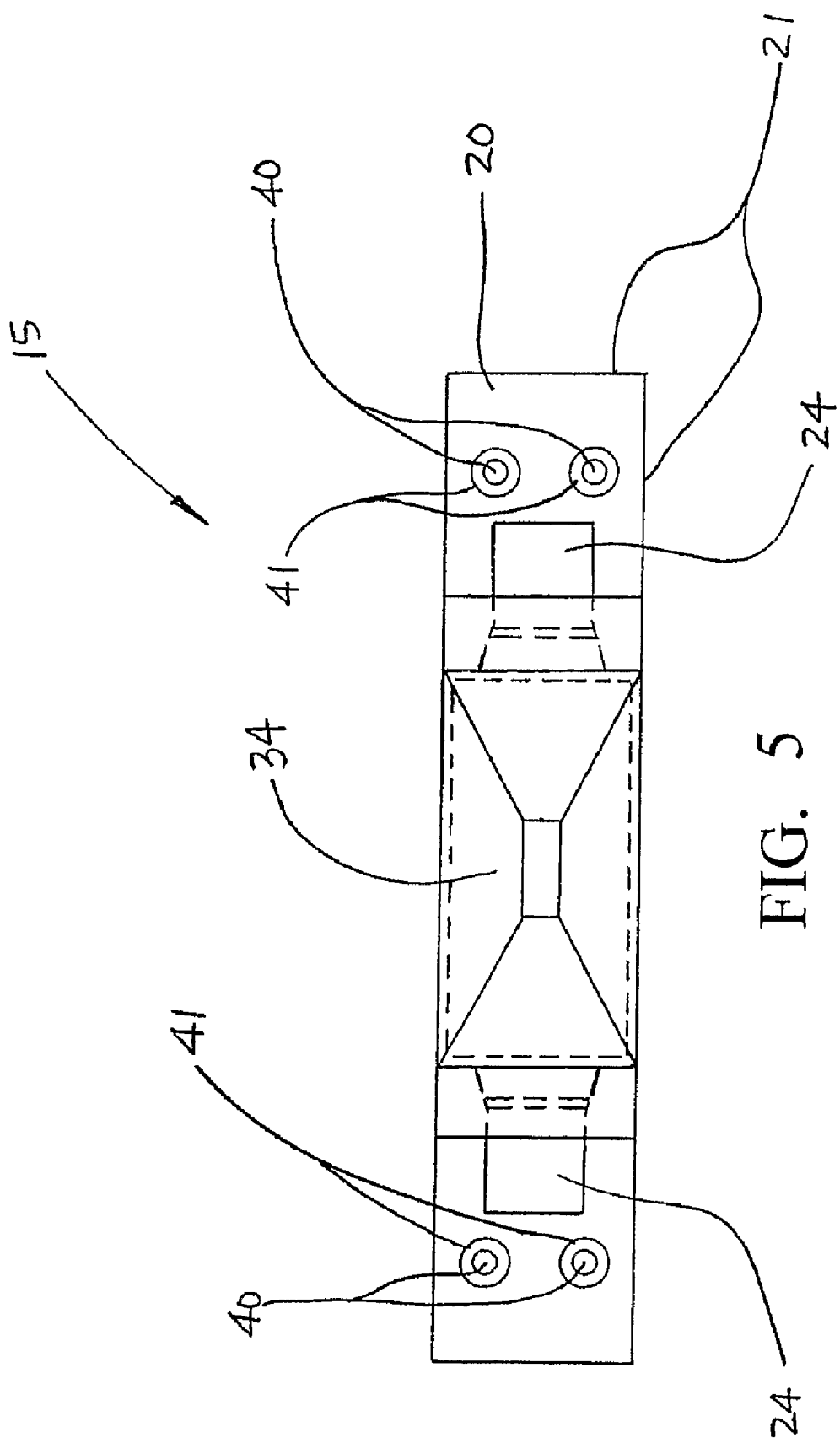
FIG. 5 is a top perspective view of the apparatus 15 of FIGS. 2-4.

As seen in FIGS. 2 and 4, adjustable gate assemblies 53 are provided over top the feeding compartments 24 to limit access thereto. Each gate assembly 53 comprises a secondary cover 54 fixedly attached to the feed bin shroud 33, and covering a bottom adjustable plate 55. Adjustable plate 55 is attached to mounting holes in the feed trough/receptacle 20, and adjustable plate 55 is provided with a corresponding series of adjustment holes for screw-attachment. By sliding the plate 55 forward or backward feed access can be restricted in discrete increments (for example, 0", ½", 1", and 1½"). The secondary cover 54 is then secured in place (via set screws or the like) to cover the slide plate 55, and in this manner the adjustable gate assemblies 53 as a whole vary the feeding animals access to the feeding compartments 24. The intent here is to limit access as much as possible so that the feeding animal needs to tilt their head to dig under the gate assembly 53 in order to reach the feed in feeding compartments 24. This ensures that the animal makes full contact with flexible applicators 40 (to be described) all of which carry pesticide.

Each flexible applicator 40 (four are shown) comprises a support member 44 equipped with an absorbent applicator sleeve 41. The support members 44 are positioned adjacent the outlying corners of each feeding compartment 24, opposite the feed bin opening, and each is slidably inserted into a conforming sleeve formed in trough/receptacle 20. Preferably, the base of each support member 44 is equipped with a detent pin for positive locking-engagement with the sleeves of trough/receptacle 20. In the illustrated embodiment, four pesticide applicator sleeves 41 are slidably inserted, one on each support member 44, likewise positioned at the corners of feed bin 30. One skilled in the art will understand that the number of support members 44 and applicator sleeves 41 can be varied in accordance with the number of feeding compartments 24. Pesticide applicator sleeves 41 extend upwardly above the upper edge of the trough assemblies' side walls 21. Pesticide applicator sleeves 41 are similar to paint rollers, and each is slidably inserted onto a corresponding support member 44, which in turn is installed into a corresponding molded sleeve in trough/receptacle 20. The pesticide applicator sleeves 41 may be secured in place on support members 44 by detent caps 42. Pesticide applicator sleeves 41 are adapted to apply pesticide onto an animal upon contact.

Both the feed bin 30 and trough/receptacle 20 are preferably configured to be shipped separately and economically (for example, multiple feed bins 30 may be stacked), but otherwise the size/shape may be varied to meet a wide variety of application-specific parameters. Thus, the device may be shipped partially assembled for complete assembly by the user. Final assembly proceeds as follows:

1. Secure feed bin 30 to the trough/receptacle 20 with four (2 each side) screws and four flat washers as shown (for example, ¼×20×1" screws). Install legs (not shown) in sleeves 25 in the trough/receptacle 20.

2. Slide each divider gate 23 into the slot at each end of the trough/receptacle 20. Assure that the divider gates 23 are fully seated.

3. Place adjustable plate 55 over mounting holes in the trough/receptacle 20. In the illustrated embodiment adjustable plate 55 has four sets of adjustment holes. By sliding the plate 55 forward or backward feed access can be restricted by 0", ½", 1", and 1½".

4. Place secondary cover 54 over the adjustable plate 55 with mounting holes aligned to the adjustable plate 55 and the trough/receptacle 20. Assemble as shown in FIG. 4, and install nine ¼"×20×1" screws, and an equal number of flat washers. Repeat this procedure at both ends to install both secondary covers 54.

5. Install four support members 44 into sleeves in the trough/receptacle 20. The detent pins should snap into corresponding lock holes in the sleeves to hold the support members 44 in place.

6. Slide pesticide applicator sleeves 41 over each of the four support members 44 and install detent caps 42 overtop. Again, the detent pin of support members 44 should snap into lock holes in the caps 42 to hold the caps 42 in place.

7. Place container lid 34 onto feed bin 30 and secure the lid 34 to feed bin 30 with the latches 35.

8. Fill the feed bin 30 and wet the pesticide applicator sleeves 41 with liquid pesticide.

Given the foregoing assembly, when attempting to feed, animals access the feeding compartments 24 from either side of the apparatus by inserting their heads between a support member 44 and the feed bin 30. The animals are effectively forced by gate assemblies 53 to turn their head sideways, thereby ensuring better contact with an applicator sleeve 41. The back of the head, the neck, and/or the ears of the animal will contact one of the applicator sleeves 41 during the feeding process, resulting in the application of the pesticide. Further enhancement of the pesticide application process occurs if the animal chooses to deliberately and/or vigorously rub against the applicators 41 while feeding. The application of the pesticide to the aforementioned areas of the animal provides significant ectoparasite control because they are the locations that usually harbor the greatest number of ticks.

Figure 6:
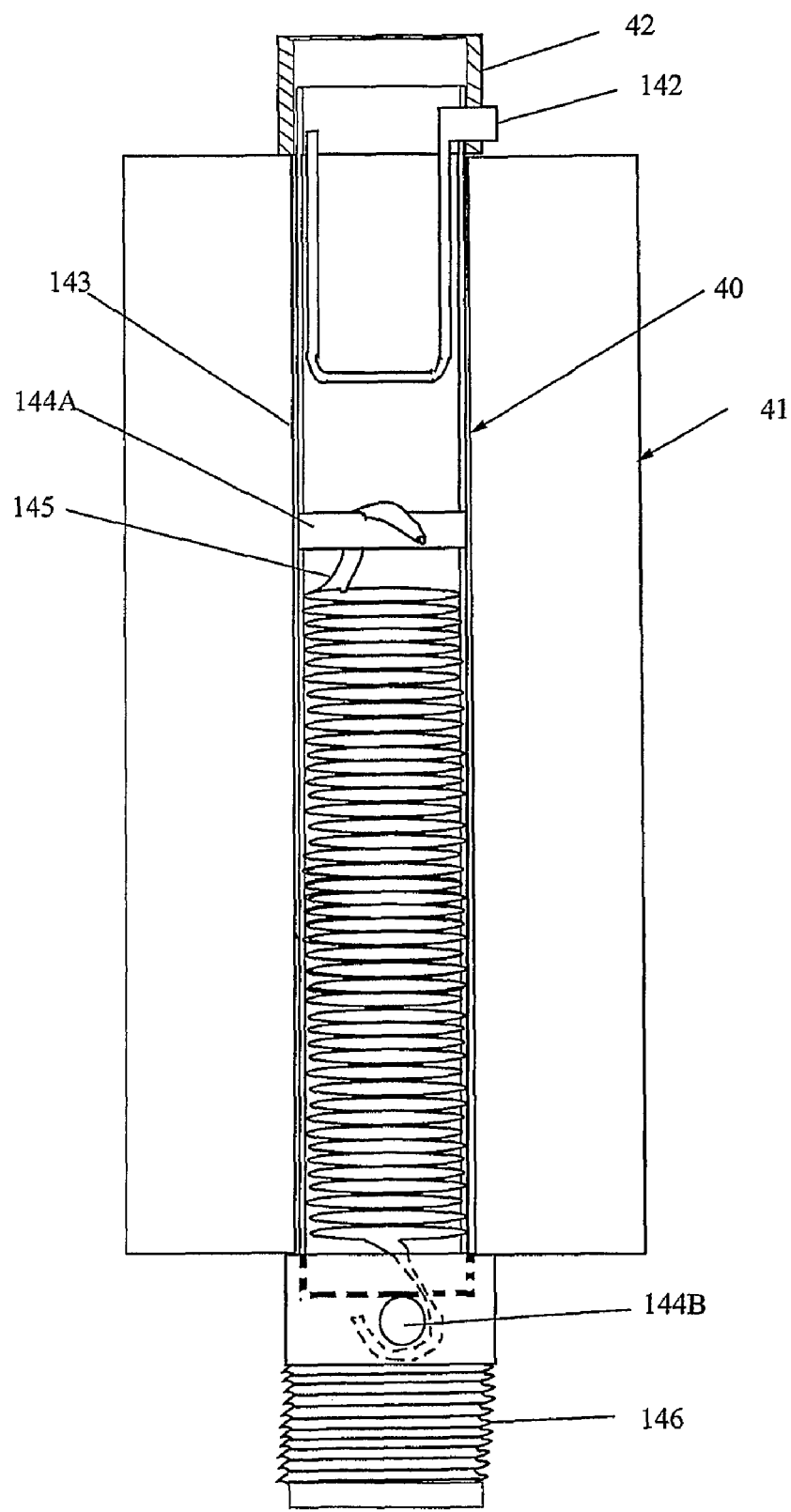
FIG. 6 is a cross-sectional view of a flexible applicator 40 including support member 44 and applicator sleeve 41 according to a first embodiment of the present invention.
Figure 7:
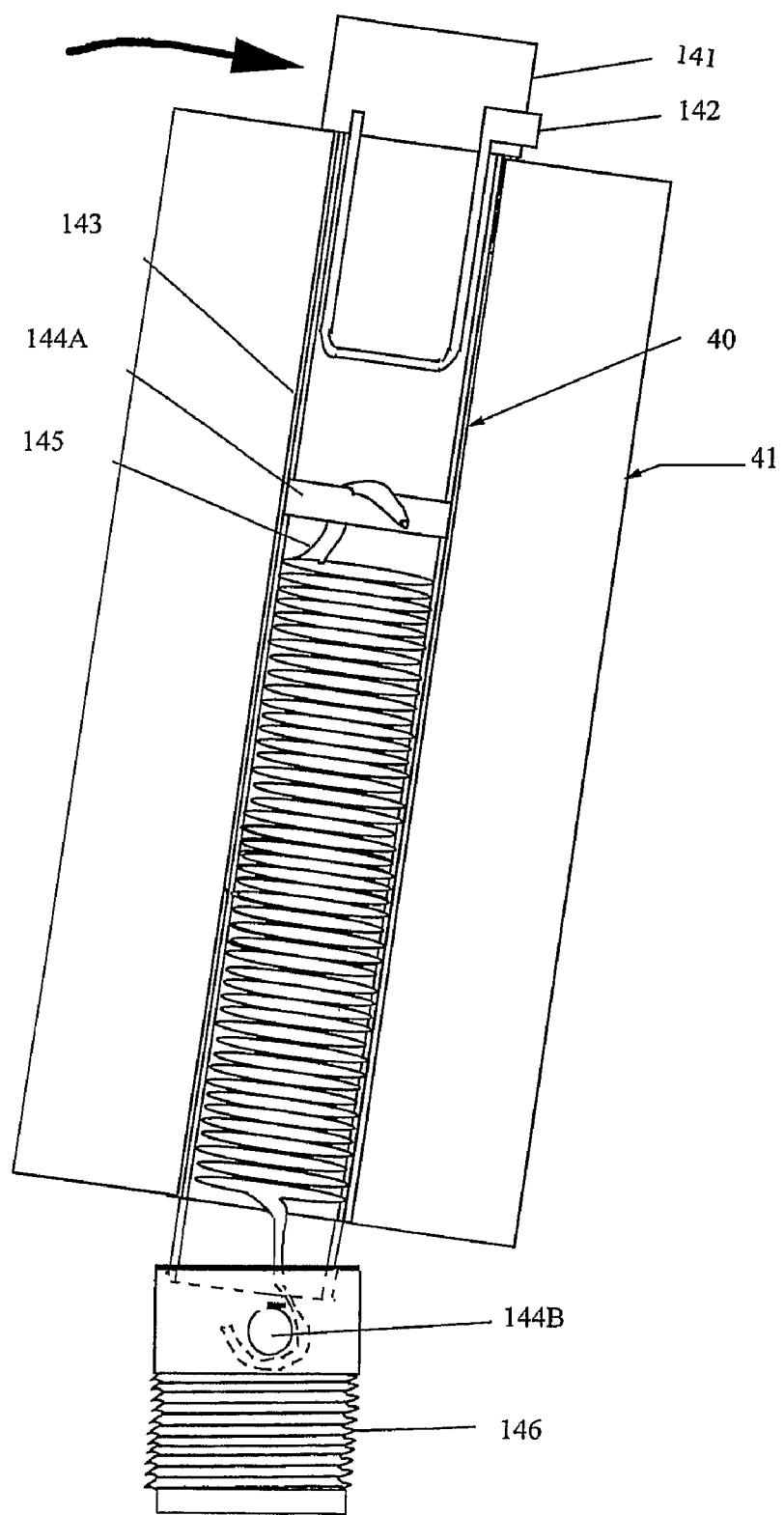
FIG. 7 is a cross-sectional view of the flexible applicator 40 flexible applicator 40 support members 44 flexible applicator 400f FIG. 6 shown in a deflected condition due to the introduction of a side load or force.

FIGS. 6 and 7 are cross-sectional views of an exemplary flexible applicator 40 including support member 44 and applicator sleeve 41 according to the preferred embodiment of the present invention. FIG. 6 shows support member 44 and applicator sleeve 41 in an unloaded condition (i.e. not subject to a side load or force), while FIG. 7 shows them in a deflected condition due to the introduction of a side load or force (i.e. caused by a feeding animal).

As can be seen in both FIG. 6 and FIG. 7, the support members 44 are adapted to flex slightly such that they accommodate the head, neck, or ears of a feeding animal. In accordance with the illustrated embodiment of the support member 44, this is accomplished by forming the support member with a spring-loaded rocker-base to allow a limited degree of rocking, with a tendency to right itself to an erect position when not biased. To this end each support member 44 further comprises an assembly of conventional PVC tubing components including a section of pipe 143 with a removable upper detent cap 42. The cap 42 is held in place by a conventional thumb-detent pin 142 inserted into the pipe section 143 and protruding out through aligned holes in both the pipe section 143 and cap 141. Thus, by depressing the detent pin 142 the cap may be easily removed to insert or replace the applicator 41 when necessary (by slidable insertion onto pipe section 143). The pipe section 143 extends downward to a rocker base 146 which may be a conventional threaded PVC pipe coupling. The pipe section 143 is seated loosely in the rocker base 146 and is not affixed, and so remains free to pivot therein by approximately +/−20 degrees in any direction. The pipe section 143 is biased into the rocker base 146 by an extension spring 145 that is extended between two pins 144A & 144B.

The first pin 144A is inserted through the pipe section 143 midway along its length, while the second pin 144B is inserted with a 90 degree offset through the rocker base 146 beneath the pipe section 143. Thus, spring 145 compresses the pipe section 143 into the rocker base 146 and maintains it in an erect orientation when not influenced by outside pressure. The threaded rocker base 146 may be inserted directly into the sleeves in the trough/receptacle 20 (see FIG. 4). The spacing and height of the support members 44, as well as the diameter of the applicators 41, can vary and may be readily determined by one skilled in the use of the apparatus 15. The spacing of the support members 44/applicators 41 and the feed bin 30 is sufficient to entice an animal to pass its head through an opening in order to access a feeding compartment 24, but the recessed feed tray forces the animal to crane its neck such that the neck, ears, and/or back of the head of the animal will contact one or more of the applicators 41 during the feeding process. The height of the support members 44/applicators 41 should be great enough to extend above the animal's head when feeding. The flexibility of the support members 44/applicators 41 allows an animal possessing antlers, horns, etc. to feed just as easily as one that does not have them.

FIG. 6 shows support member 44 and applicator sleeve 41 in an unloaded condition (i.e. not subject to a side load or force), while FIG. 7 shows them in a deflected condition due to the introduction of a side load or force (i.e. caused by a feeding animal).

One skilled in the art will understand that alternate support members 44 and applicators 41 are possible without departing from the scope and spirit of the present invention. For example, rather than a rocker base 46 the pipe section 143 may be rigidly mounted but formed of flexible material to allow bending, such as a solid rubber cylinder, a hollow rubber tube section, or a cylindrical spring fabricated of rust-resistant metal or plastic.

The applicators 41 may be constructed to deliver liquid (wet), solid or particulate (dry powder) pesticides. Virtually any pesticide may be applied including insecticides, specifically acaricides. However, only EPA approved/allowed pesticides may legally be used, and those that are specifically listed below are EPA approved. In the illustrated embodiment, the applicator sleeve 41 is an absorbent material that is periodically saturated (e.g. when the feed storage bin 30 is refilled) with pesticide. An absorbent material such as Draylon™ fabric wrapped about a tubular plastic or cardboard core is suitable for this purpose. A ½"-¾" nap fabric works well (and retains the tickicide for a full week), and a bonded plastic core lasts longer than cardboard cores. The applicators 41 are periodically dosed with pesticide simply by wetting with tickicide on a weekly basis. The preferred tickicide is EPA approved 4 Poster (tm) liquid tickicide which is 10% permethrin-based. Alternatively, rather than periodic wetting, an optional on-demand automatic feed/delivery system may be used as described below.

The optional pesticide feed/delivery system is more suitable in remote locations where weekly maintenance is undesirable. In accordance an embodiment incorporating a gravity-fed delivery system, the supply of pesticide to the applicators may occur through a pesticide reservoir connected with the top of each applicator sleeve 41 through a conduit. To prevent dripping and/or excess accumulation of pesticide on the applicators 41, pressure activated flow control valves may be provided to open and allow the flow of pesticide onto the applicators 41 when pressure, or a side load/force, is applied upon the applicator sleeve 41 by the feeding animal. Preferred valves include, but are not limited to, conventional spring-loaded pinch valves. In addition, a shut-off valve may also be provided to disrupt flow completely. One skilled in the art will understand that a variety of other liquid-based delivery systems may be utilized. For example, a pesticide reservoir may be located within the molded body of the trough/receptacle 20 below the lower end of each applicator sleeve 41 (or each pair of applicators), with pesticide being wicked into the absorbent material of the applicator sleeve 41. In yet another alternative embodiment, a pressure activated pump or a pressurized container may be utilized to transfer pesticide from a reservoir to the applicators 41. These variations are considered to be within the scope and spirit of the present invention.

Furthermore, solid pesticides may also be used. In this case, the applicators 41 may be plastic strips impregnated with dry pesticide, the strips being wrapped or wound around each support member 44. Pesticide-laden materials/strips suitable for use in this embodiment include, but are not limited to, Taktic strips impregnated with amitraz and commercially available from Hoechst Roussel Agri-Vet Company of Sommerville, N.J.

In all such cases the apparatus 15 may be used for the control of a variety of animal/wildlife-borne ectoparasites including, but not limited to, ticks (e.g. deer ticks, cattle fever ticks, ear ticks), mites (e.g. ear mites), lice, fleas, and flies (e.g. horn flies, stable flies).

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

INDUSTRIAL APPLICABILITY

There is a significant commercial demand for an improved feeder device that concurrently applies pesticides to wildlife to control the spread of ecto-parasite-borne diseases and, more specifically, a feeder/applicator that accomplishes these goals by a simple, durable molded design that can be economically manufactured and mass-produced to provide for more widespread use. The present invention fulfills this demand with a multi-part molded design that combines a refillable feeding bin with flexible pesticide applicators for the application of pesticides to animals as they feed from the bin, the applicators accommodating animals that vary greatly in physical size. The feeder/applicator of this invention is positioned in the locus or vicinity of the animals to be treated. Animals attracted to the apparatus to feed will be subjected to the application of a pesticide upon their head, neck, ears, and/or, where applicable, antlers or horns upon contact with one or more of the applicators.

We claim:

1. An apparatus for applying pesticides to animals comprising:
   an integrally-molded open top receptacle formed with a recessed feeding compartment;
   a feed bin positioned above said receptacle on one side of said feeding compartment, said bin having an opening at the lower end thereof opening into said receptacle for dispensing feed into said feeding compartment; and
   at least one pair of spaced apart rocker bases positioned on opposing sides of said feeding compartment opposite said feed bin, said rocker bases each comprising a vertically oriented recess and a first transverse pin horizontally positioned within said recess;

at least one pair of spaced apart flexible pesticide applicators positioned in said rocker bases, each applicator further comprising a tubular support member pivotally seated at a first end in said recess, said tubular support member bearing directly on said first transverse pin and extending upwardly there from, a second transverse pin horizontally positioned within said tubular support member, a spring engaged at a first end by said first transverse pin and engaged at a second end by said second transverse pin, and an absorbent sleeve inserted over said tubular support member and adapted to apply pesticide onto a subject animal upon contact therewith.

2. The apparatus for applying pesticides to animals according to claim 1 wherein said receptacle is comprised of molded plastic.

3. The apparatus for applying pesticides to animals according to claim 2 wherein said receptacle comprises a molded trough formed with a central plateau leading into opposing feeding compartments.

4. The apparatus for applying pesticides to animals according to claim 3 wherein said feed bin opening is partially blocked by the central plateau of said receptacle to define two opposing apertures from which feed drains evenly into the feeding compartments.

5. The apparatus for applying pesticides to animals according to claim 4 wherein said central plateau ramps downward into said opposing feeding compartments for directing the feed downwardly and sideways away from the feed bin.

6. The apparatus for applying pesticides to animals according to claim 1 wherein said feed bin is fabricated of molded plastic.

7. The apparatus for applying pesticides to animals according to claim 1 wherein said tubular support members comprise a length of pipe.

8. The apparatus for applying pesticides to animals according to claim 7 wherein said tubular support members include a removable cap at a second end of the length of pipe.

9. The apparatus for applying pesticides to animals according to claim 1 wherein said pesticide applicator sleeves comprise a tubular roll of flexible, absorbent material.

10. The apparatus for applying pesticides to animals according to claim 3 further comprising a gate assembly restricting access to said opposing feeding compartments to prompt feeding animals to tilt their head to feed, thereby ensuring full contact with said pesticide applicator sleeves.

11. The apparatus for applying pesticides to animals according to claim 2 wherein said receptacle is molded from one of high density cross-linked polyethylene or high density polyethylene with integral reinforcing ribs.

12. The apparatus for applying pesticides to animals according to claim 3 wherein the feeding compartments are recessed below the feed bin to prevent water from entering the feed bin.

13. An apparatus for applying pesticides to animals while they are feeding, comprising:

an open top receptacle having a central plateau ramping downward on both sides into opposing feeding compartments;

a feed bin positioned above said receptacle over said plateau, said feed bin having an opening at the lower end thereof for dispensing feed down the ramps of said receptacle into said feed compartments;

at least one pair of spaced apart rocker bases positioned on opposing sides of each feeding compartment opposite said feed bin, said rocker bases each comprising a vertically oriented recess and a first transverse pin horizontally positioned within said recess;

at least one pair of flexible pesticide applicators each extending upwardly from said rocker bases, each of said applicators further comprising a vertical support member received in said recess and bearing on said first transverse pin, a second transverse pin within said vertical support member, a spring engaged at a first end to said first transverse pin and at a second end to said second transverse pin, and an absorbent sleeve adapted to be wetted with pesticide and to apply said pesticide onto a subject animal upon contact therewith.

14. The apparatus for applying pesticides to animals according to claim 13 wherein said receptacle is comprised of molded plastic.

15. The apparatus for applying pesticides to animals according to claim 14 wherein said feed bin opening is partially blocked by the central plateau of said receptacle to define two opposing apertures from which feed drains evenly into the feeding compartments.

16. The apparatus for applying pesticides to animals according to claim 14 wherein each of said vertical support members comprises a length of pipe seated in said rocker base.

17. The apparatus for applying pesticides to animals according to claim 14 further comprising a gate assembly restricting access to said opposing feeding compartments to prompt feeding animals to tilt their head to feed, thereby ensuring full contact with said pesticide applicator sleeves.

* * * * *